United States Patent
Ishida et al.

(10) Patent No.: US 8,745,813 B2
(45) Date of Patent: Jun. 10, 2014

(54) WIPER BLADE WITH A SUPPORTING ELEMENT

(75) Inventors: Yoshiyuki Ishida, Kanagawa (JP); Christian Wilms, Koersel-Beringen (BE); Yutaka Yamada, Buehl (DE); Wim Verboven, Tessenderlo (BE); Frank Diedrich, Tienen (BE); Mohamed Aznag, Scherpenheuvel-Zichem (BE); Ishikawa Yoshiki, Toyota (JP); Bernard Behr, Saint Jean Saverne (FR); Hubert Verelst, Tienen (BE)

(73) Assignees: Robert Bosch GmbH, Stuttgart (DE); Toyota Jidosha Kabushiki Kaisha, Aichi (JP)

( * ) Notice: Subject to any disclaimer, the term of this patent is extended or adjusted under 35 U.S.C. 154(b) by 1080 days.

(21) Appl. No.: 12/377,912

(22) PCT Filed: Aug. 13, 2007

(86) PCT No.: PCT/EP2007/058354
§ 371 (c)(1),
(2), (4) Date: Apr. 10, 2009

(87) PCT Pub. No.: WO2008/020003
PCT Pub. Date: Feb. 21, 2008

(65) Prior Publication Data
US 2011/0126373 A1 Jun. 2, 2011

(51) Int. Cl.
*B60S 1/32* (2006.01)
(52) U.S. Cl.
USPC ............... 15/250.361; 15/250.48; 15/250.43; 15/250.451; 15/250.453
(58) Field of Classification Search
USPC ......... 15/250.48, 250.451, 250.452, 250.453, 15/250.454, 250.361, 250.201, 250.44, 15/250.43
See application file for complete search history.

(56) References Cited

U.S. PATENT DOCUMENTS

| | | | | |
|---|---|---|---|---|
| 3,003,174 A | * | 10/1961 | Anderson | 15/250.44 |
| 3,094,734 A | * | 6/1963 | Hoyler | 15/250.451 |
| 3,885,265 A | | 5/1975 | Deibel et al. | |
| 2004/0244137 A1 | * | 12/2004 | Poton | 15/250.32 |
| 2006/0107485 A1 | * | 5/2006 | Kim, III | 15/250.201 |
| 2006/0112511 A1 | * | 6/2006 | Op't Roodt et al. | 15/250.43 |
| 2007/0289082 A1 | | 12/2007 | Herinckx et al. | |
| 2008/0016643 A1 | | 1/2008 | Braun et al. | |

FOREIGN PATENT DOCUMENTS

| | | | | |
|---|---|---|---|---|
| EP | 1176070 A2 | * | 1/2002 | 256/34 |
| JP | 56143148 | | 10/1981 | |

OTHER PUBLICATIONS

Braun, Hans, Wiper Blade, Dec. 8, 2005, WO 2005/115813 A1.*
PCT/EP2007/058354 International Search Report.

* cited by examiner

*Primary Examiner* — Lee D Wilson
*Assistant Examiner* — Henry Hong
(74) *Attorney, Agent, or Firm* — Michael Best & Friedrich LLP (57) ABSTRACT

The invention is based on a wiper blade (10) with a supporting element (12) which has two interconnected spring rails (30), and with a wiper strip (14) which is received by the spring rails (30) in a manner allowing it to be exchanged. It is proposed that one end of the wiper strip (14) is connected fixedly to a thickened portion (74, 98, 100, 108, 110, 112, 114) by means of which the wiper strip (14) can be fixed relative to the supporting element (12).

20 Claims, 8 Drawing Sheets

WIPER BLADE WITH A SUPPORTING ELEMENT

BACKGROUND AND SUMMARY OF THE INVENTION

The invention is based on a wiper blade with a supporting element.

DE 10 2004 051 467 A1 discloses a wiper blade of the type in question. Its supporting element comprises two spring rails which run parallel to each other and are connected to each other at their ends by a bridge. In order to receive a wiper strip, the spring rails form a longitudinal gap, and therefore the wiper strip can be threaded in the longitudinal direction onto the supporting element. The wiper strip is secured in the longitudinal direction relative to the supporting element by end caps. The latter have an element with a spike which is pressed at the end of the installation into a top strip of the wiper strip. In the fitted state, the spike bears against the bridge end side which faces away from the end of the wiper strip. In one exemplary embodiment, the spike is located on a spring tongue which is pressed against the top strip by a flap with an eccentric. The pivot axis of the flap runs transversely with respect to the longitudinal direction of the wiper blade. In another embodiment, the spike is arranged directly on the flap, with the pivot axis of the flap being provided in the vicinity of the outer end wall of the end cap.

According to the invention, one end of the wiper strip is connected fixedly to a thickened portion by means of which the wiper strip can be fixed relative to the supporting element. This expediently takes place in that the thickened portion can be placed against a bridge which connects the spring rails to each other, or against an end side of the spring rail. In this position, the wiper strip is fixed relative to the supporting element in an advantageous manner by an end cap. The latter can engage over the thickened portion and the bridge and can latch in the position by means of releasable latching means. In the event of removal of the wiper strip of the wiper blade, the latching means are released, and therefore, after removal of the end cap, the wiper strip can be pulled out of the supporting element. The design according to the invention results in a simple means of fixing the wiper strip to the supporting element which requires little construction space, and therefore the end cap can harmonically adjoin the profile of a wind-deflecting strip of the wiper blade. This reduces flow losses and wind noises at the wiper blade.

The thickened portion can be realized by different design elements, for example by separate structural elements which are connected to the wiper strip, or by integrally formed parts which bring about a local cross-sectional enlargement of the cross-sectional profile of the wiper strip at the end of the wiper strip. The former measures include clips made of metal or plastic or a combination of these materials, for example plastic-coated metal clips or bow-shaped plastic parts which are fastened to the wiper strip by metal clips. In the simplest case, staples suffice, the limbs of which, facing the wiping lip, are pressed by the upper part of the head strip and are bent over towards the web which runs between the longitudinal grooves for the spring rails.

Another possibility is that the staple runs in the longitudinal direction of the wiper strip while its limbs pierce the web between the longitudinal grooves transversely with respect to the longitudinal direction and are bent over inwards on the opposite side of the web. If the thickened portion is integrally formed on the wiper strip, it can completely or partially fill the longitudinal grooves in the end region thereof. Furthermore, it can protrude as a bead or projection over the normal cross-sectional profile of the wiper strip. These may be parts of the wiper strip which are joined to it by injection moulding or extrusion and are made of an identical or similar material. In principle, it is also possible to connect said parts to the wiper strip as separate parts by adhesive bonding, vulcanization or welding.

According to a refinement of the invention, at least one end cap is provided which has an opening which can be opened and closed. A flap or a slide closing the openings is used for this. The flap is connected to the cap via a film hinge, the pivot axis of which runs in the longitudinal direction of the wiper blade. In the closed state, the flap latches with a latching edge on a connecting web of the end flap, with the one end side being placed by means of a rib against the bridge of the supporting element. The outer contour of the closed flap ends flush with the approach flow surface or moulding of the end cap, and therefore, even in the case of high speed vehicles, wind noises are not produced at the end cap.

In another embodiment, the opening is provided on the outer end side of the end cap. It serves, inter alia, for the installation and removal of the wiper strip. The opening can be closed by the slide which can be displaced transversely with respect to the longitudinal direction of the wiper blade and is fixed in a closed position by a latching element. For better handling, grippy surface structures, for example in the form of bumps, scores or roughened portions, can be provided on the flap and on the slide.

BRIEF DESCRIPTION OF THE DRAWINGS

Further advantages emerge from the description below of the drawings. The drawing illustrates exemplary embodiments of the invention. The drawing, the description and the claims contain numerous features in combination. A person skilled in the art will expediently also consider the features individually and put them together to form meaningful further combinations.

In the drawing.

DETAILED DESCRIPTION

Figure 1:
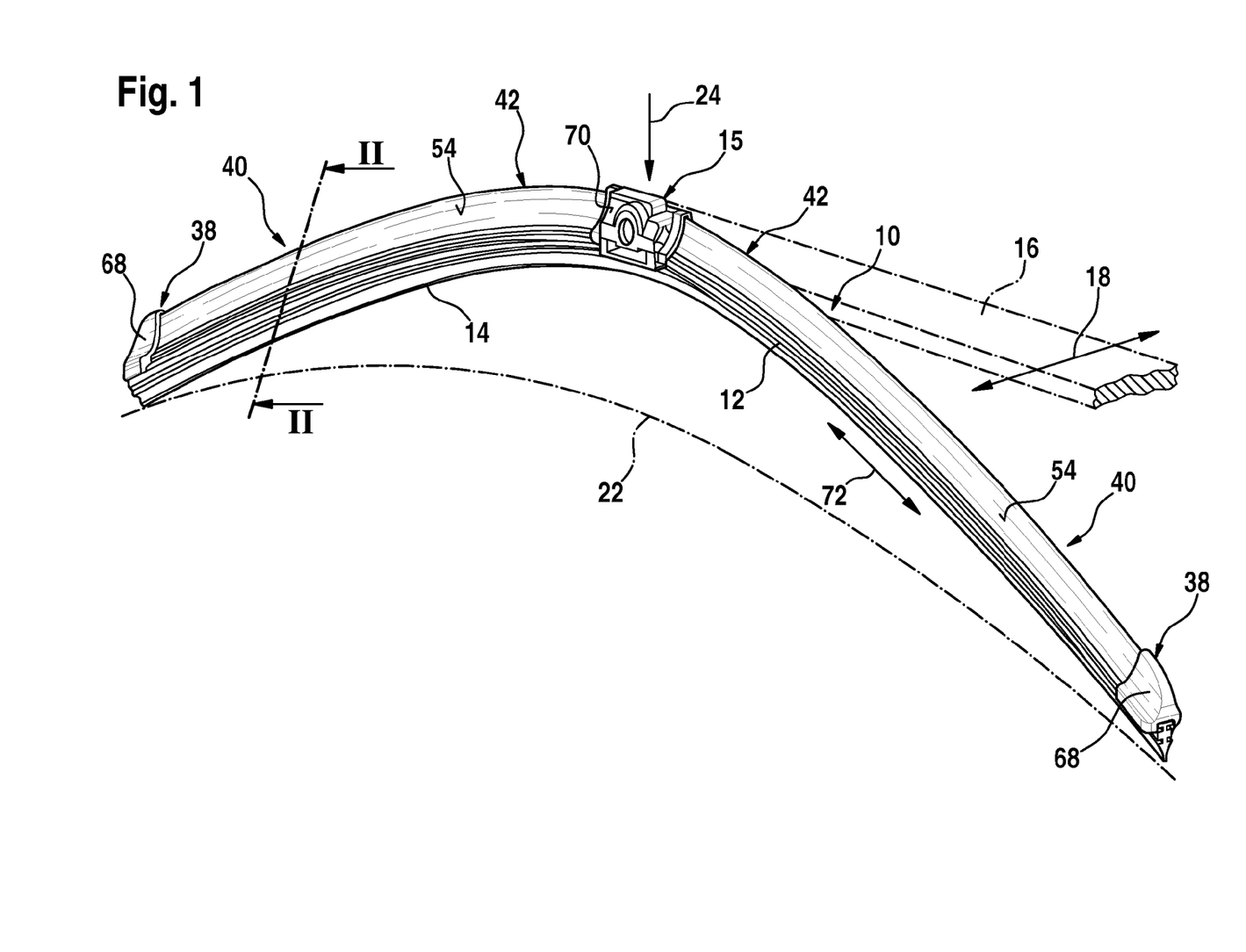
FIG. 1 shows a perspective illustration of a wiper blade.
Figure 2:
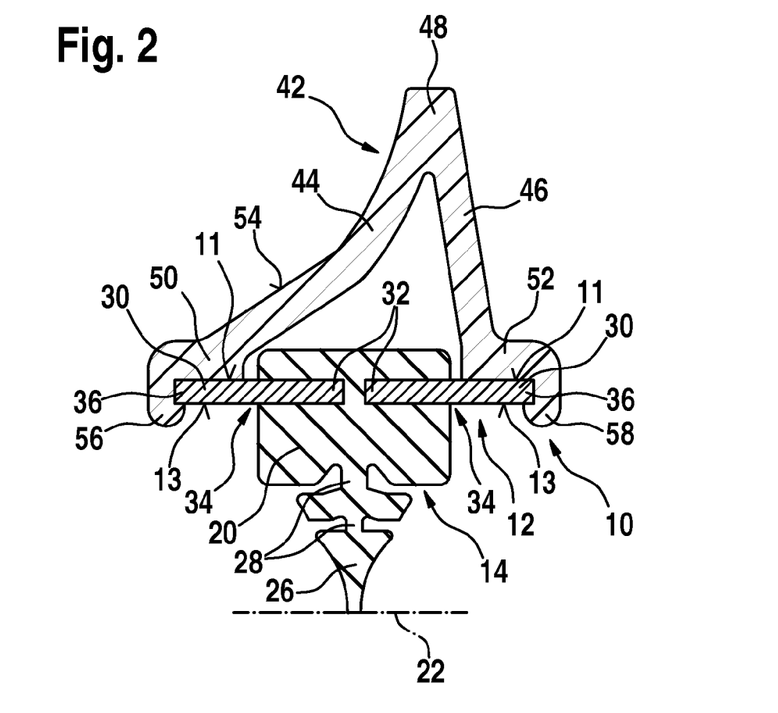
FIG. 2 shows a section corresponding to the line II-II in FIG. 1.

A wiper blade 10 has a resilient supporting element 12, which is elongate in the manner of a band and is in the form of two spring rails 30 running parallel to each other at a distance (FIGS. 1 and 2). The latter are inserted by means of their mutually facing, inner edge strips 32 into longitudinal grooves 34 of a top strip 20 of a wiper strip 14 while their outer edge strips 36 protrude laterally for a distance out of the longitudinal grooves 34. Towards a vehicle window 22, the top strip 20 is adjoined via webs 28 by a wiping lip 26 which slides over the vehicle window 22 during a wiping movement in the direction of a double arrow 18. For this purpose, a wiper arm 16 drives the wiper blade 10 via a connecting device, the wiper-blade-side part 15 of which can be connected in an articulated and releasable manner to the wiper arm 16 while it sits fixedly in the central region of the wiper blade 10 on the supporting element 12 thereof. At the same time, the wiper arm 16 loads the wiper blade 10 with a contact pressure 24 in the direction of the vehicle window 22. The wiper arm 16 and the vehicle window 22 are indicated by chain-dotted lines.

The sharpest curvature of the vehicle window 22 is smaller than the curvature of the as yet unloaded wiper blade 10, which rests with its two ends on the vehicle window 22 (FIG. 1). Under the contact pressure 24, the wiper blade 10 comes to rest against the vehicle window 22 over its entire length by means of its wiping lip 26. At the same time, a stress builds up in the resilient supporting element 12, which is manufactured from metal, this stress ensuring proper contact of the wiper strip 14 or wiping lip 26 with the vehicle window 22 over its entire length and uniform distribution of the contact pressure 24.

It is apparent from FIG. 2 that, in the exemplary embodiment, the spring rails 30 of the supporting element 12 are arranged in a common plane approximately parallel to the vehicle window 22. They are secured in their longitudinal grooves 34 by the wiper-blade-side part 15 of the connecting device in the central region of the wiper blade 10 and by end caps 38 arranged at each end of the wiper blade 10. For this purpose, said structural elements 15 and 38 engage around the outer edge strips 36 of the spring rails 30. Subsections 40 of a wind-deflecting strip 42 are arranged between the part 15 and each of the two end caps 38. The arrangement of the wind-deflecting strip 42 with respect to the wiper strip 14 and the configuration can be gathered from FIGS. 2 and 3.

Figure 3:
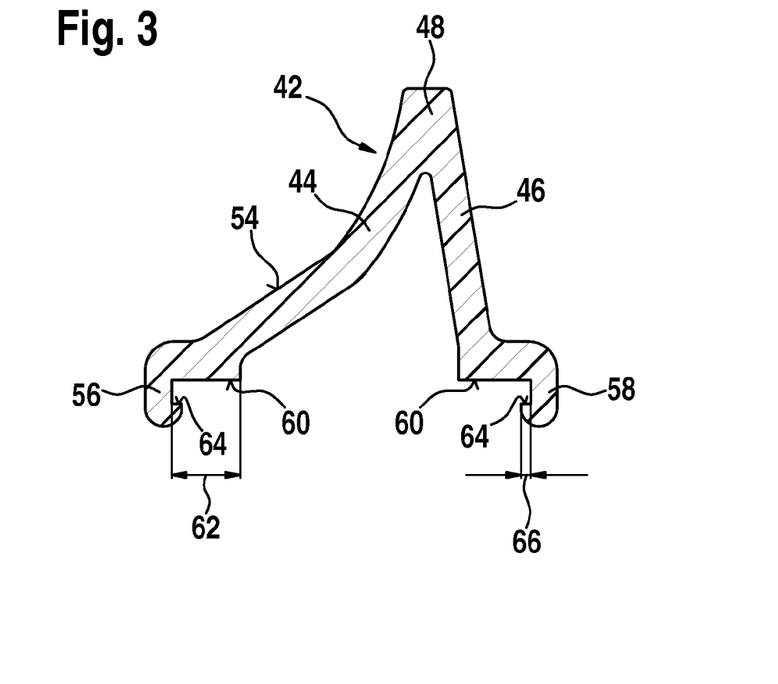
FIG. 3 shows a section through a wind-deflecting strip according to FIG. 2.

The wind-deflecting strip 42, which is composed of an elastic material, for example of a plastic, and its two subsections 40 sit on the upper band side 11 of the supporting element 12. As seen in cross section, the wind-deflecting strip 42 has diverging limbs 44 and 46 which are connected to each other on a common longitudinal back 48. The free ends 50 and 52 of the limbs 44 and 46 face the vehicle window 22 and are supported on the wiper blade 10 and on its supporting element 12, respectively. An approach flow surface 54, which is moulded in the exemplary embodiment, is formed on the one limb 44, on the outside thereof, and is primarily approached by the flow of the relative wind during the operation of the wiping device. The cross-sectional shape, which is apparent from FIGS. 2 and 4, of the wind-deflecting strip 42 and of its subsections 40 can be the same over the entire length, and therefore the subsections 40 can be extruded cost-effectively. The subsections 40 of the wind-deflecting strip 42 are connected fixedly with their free ends 50 and 52 of the limbs 44, 46 to the wiper blade 10 and to its supporting element 12.

For this purpose, the free ends 50 and 52 of the limbs 44, 46 of the wind-deflecting strip 42 are expediently adhesively bonded to the supporting element 12 of the wiper blade 10. To this end, the free ends 50 and 52 of the limbs 44 and 46 are provided with claw-like extensions 56, 58 which engage in a fitting manner around the outer edge strips 36 of the supporting element 12 that face away from each other. Those surfaces of the claw-like extensions 56, 58 which bear against the edge strips 36 serve as adhesive bonding surfaces with which the subsections 40 of the wind-deflecting strip 42 are adhesively bonded to the supporting element 12. For a particularly stable adhesive bonding connection, the claw surfaces 60 (FIG. 3) which bear against the upper band side 11 of the supporting element 12 have a greater width 62 than the claw surfaces 64 which engage on the lower side 13 and the width of which is provided with the reference number 66 in FIG. 3. It can be seen from FIG. 1 that the moulded approach flow surface 54 of the subsections 40 continues both on the end caps 38 and on the part 15 of the connecting device. The moulding of the end cap 38 has the reference number 68 in FIG. 1 while the moulding of the component 15 is provided with the reference number 70.

Figure 6:
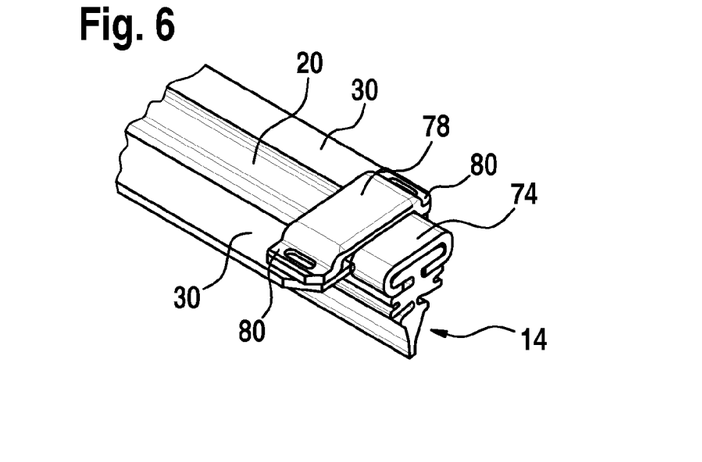

In the case of the embodiment according to FIG. 4 to FIG. 6 and FIG. 11, the thickened portion 74 is formed by a clip, the limbs 76 of which engage in the longitudinal grooves 34. The limbs 76 are pressed against the upper wall of the clip 74 until the clip 74 is fastened to the top strip 20 of the wiper strip 14 by a sufficient frictional connection. The wiper strip 14 equipped in this manner is pushed in the longitudinal direction 72 into the supporting element 12 between the spring rails 30 which are connected to each other at their ends by a bridge 78. The feet 80 of the bridge 78 are generally welded, adhesively bonded or riveted to the spring rails 30. FIG. 6 shows the final installation position of the wiper strip 14, in which the mutually facing end sides of the bridge 78 and of the thickened portion 74 bear against each other.

Figure 7:
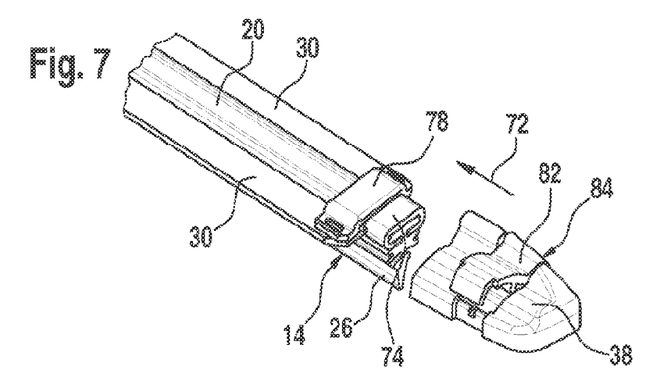
FIG. 7 to FIG. 9 show a wiper strip according to FIG. 6 with an end cap.
Figure 8:
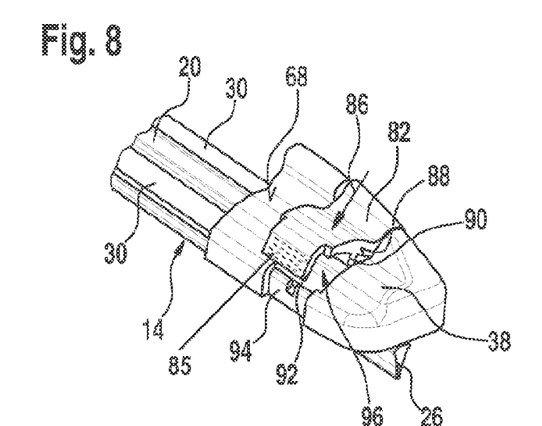
Figure 9:
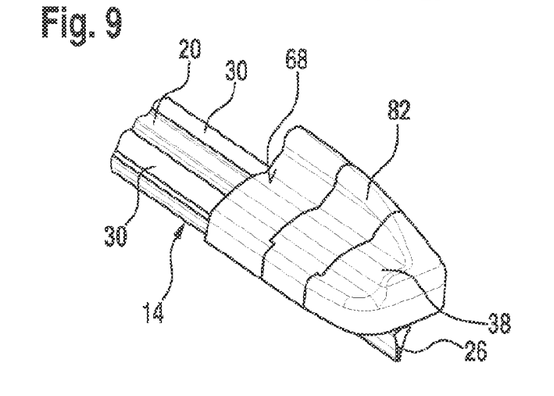

FIG. 7 to FIG. 9 show the installation of the end cap 38 and a number of details. The end cap 38 has a flap 82 which is connected to the end cap 38 via a film hinge 84. The flap 82 includes a grippy surface 85. The pivot axis of the film hinge 84 runs in the longitudinal direction 72 of the wiper strip 14, with it being possible for the flap to be opened on the approach flow side of the wiper blade 10 and, in the process, the flap opening up an opening 96. In the opened state of the flap 82, the end cap 38 can be pushed over the end of the wiper strip 14. In this case, the end cap 38 engages over the thickened portion 74 and the bridge 78. In this position, the flap 82 is closed in the actuating direction 86, with a latching edge 92 on the lower part of the flap 82 latching on a connecting web 94 which connects that part of the end cap 38 which points towards the end to the oppositely directed part. In the closed state of the flap 82, an end side 88 which faces the end of the wiper strip 14 bears with a rib 90 against the facing end side of the bridge 78 such that the supporting element 12 is fixed relative to the wiper strip 14 by the spring rails 30. The closed flap 82 ends with its outer contour flush with the moulding 68 of the end cap 38.

Figure 4:
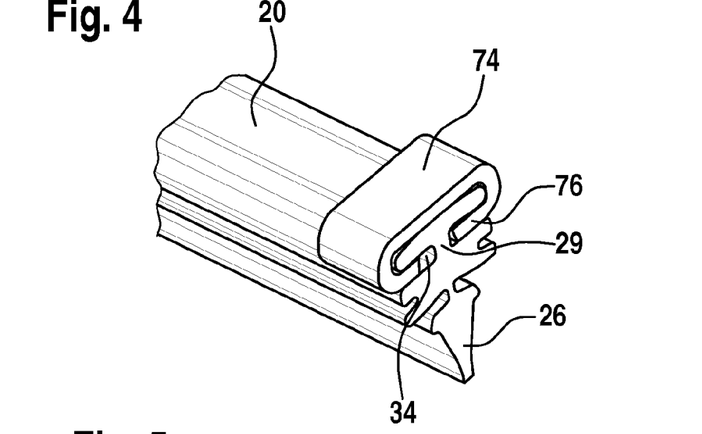
FIG. 4 shows a perspective view of one end of a wiper strip.
Figure 5:
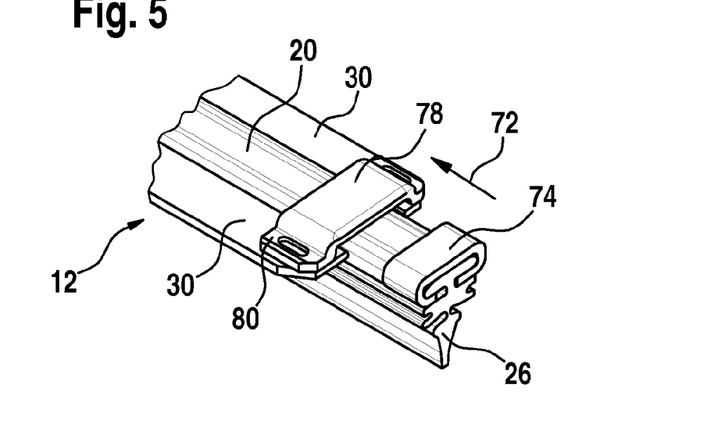
FIG. 5 and FIG. 6 show a wiper strip according to FIG. 4 with a supporting element.
Figure 11:
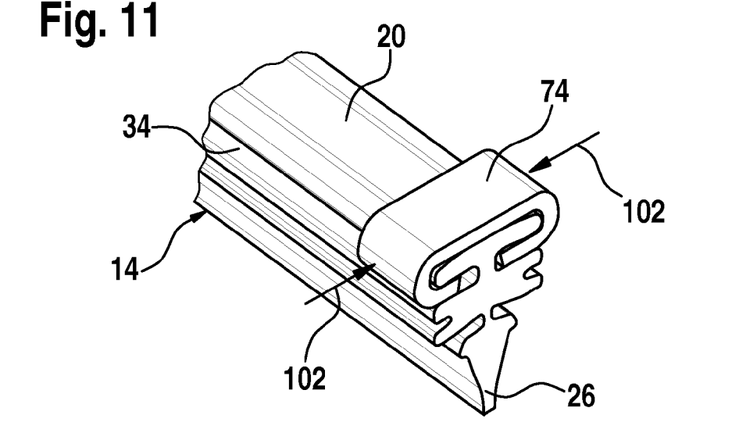

The embodiment according to FIG. 11 differs from the embodiment according to FIG. 4 in that, during the installation, the clip which forms the thickened portion 74 is compressed laterally in the pressing direction 102 until it sits fixedly on the top strip 20 of the wiper strip 14.

Figure 10:
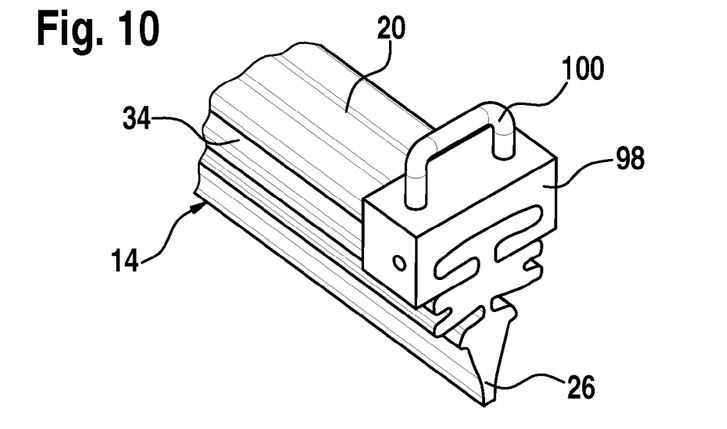
FIG. 10 to FIG. 17 show variants of a wiper strip according to FIG. 4, FIG. 18 and FIG. 19 show a variant of the end cap according to FIG. 7 and FIG. 8.
Figure 12:
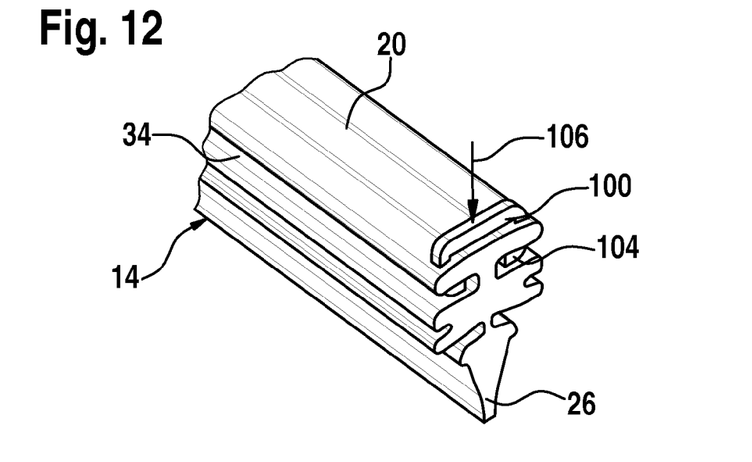
Figure 13:
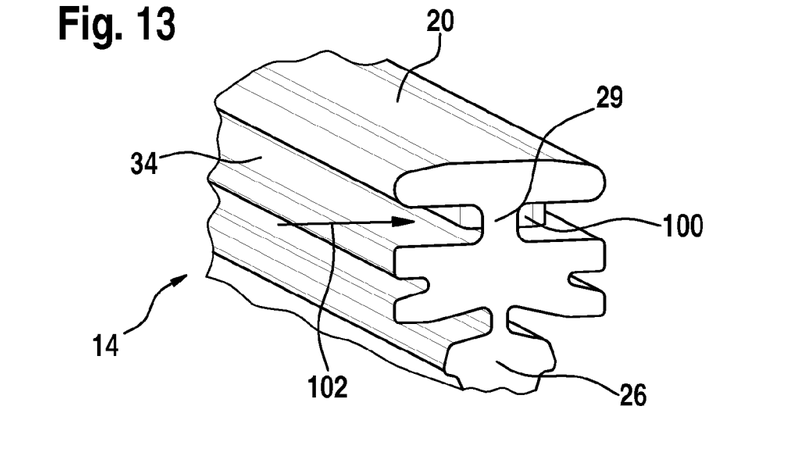
Figure 14:
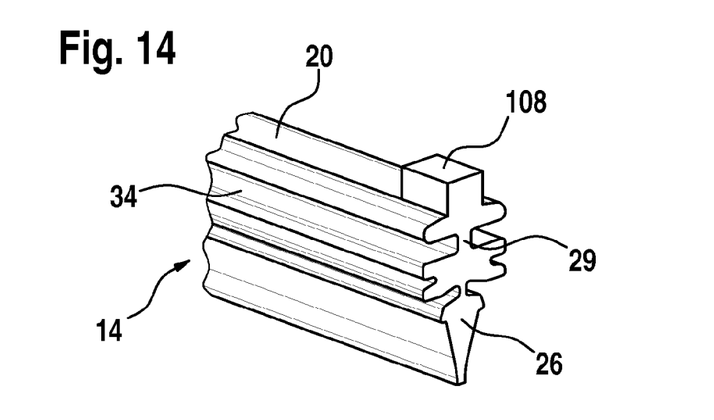

In the embodiment according to FIG. 10, a plastic part 98 is pushed onto the top strip 20 and engages in the longitudinal grooves 34. In order to fix the plastic part 98 on the top strip 20, use is made of a staple 100, the limb 104 of which (cf. FIG. 12) penetrates through the plastic part 98 into the top strip 20. In a simple case, the staple 100 can also serve as a thickened portion without the plastic part 98 by its limb 104, which initially points towards the wiping lip 26, being pressed in the installation direction 106 by the upper part of the head strip 20 and being bent over inwards in the region of the longitudinal grooves 34. The staple 100 can also be fitted in the longitudinal direction 72 of the wiper strip 14 by it being pressed in the pressing direction 102 at the end of the longitudinal grooves 34 by the web 29 between the longitudinal grooves and being bent over on the other side of the web 29.

Figure 15:
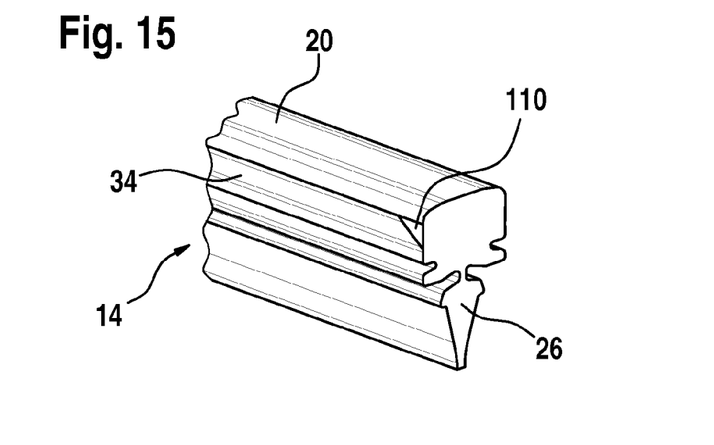
Figure 16:
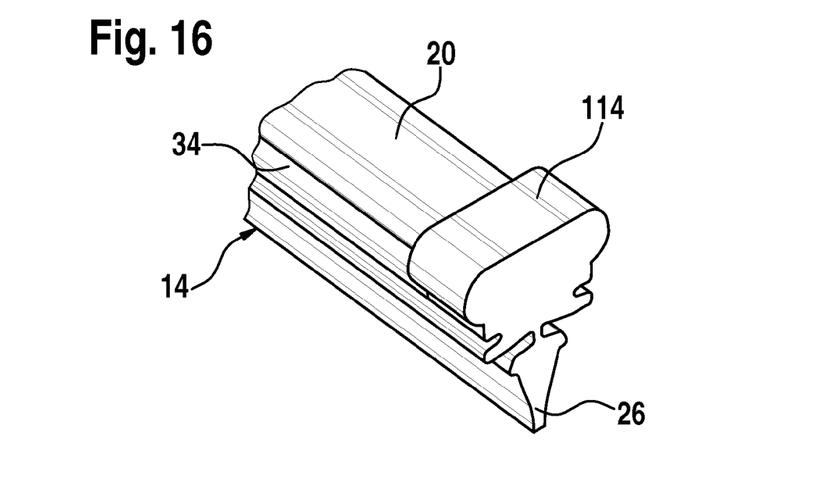
Figure 17:
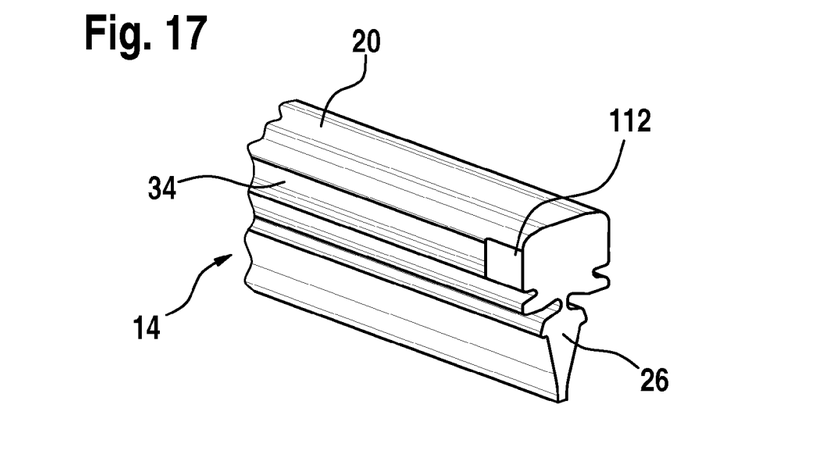

In the embodiments according to FIG. 14 to FIG. 17, thickened portions 108, 110, 112 and 114 are integrally formed as a single piece on the wiper strip 14. At the end of the wiper strip 14, the thickened portion 108 forms a projection which protrudes outwards on that side of the top strip 20 which faces away from the wiping lip 26. The thickened portion 110, FIG. 15, is formed by the longitudinal grooves 34 being partially filled at their ends, whereas the thickened portion 112 is produced by complete filling of the ends of the longitudinal grooves 34. For a thickened portion 114 according to FIG. 16, firstly, the ends of the longitudinal grooves are filled and, secondly, in addition to this measure or as a sole measure, the thickened portion 114 can be formed by a bead which protrudes outwards over the contour of the top strip 20.

Figure 18:
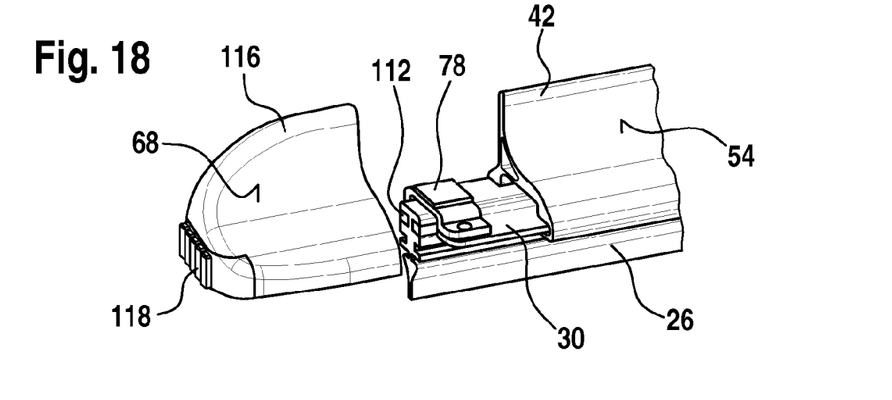
Figure 19:
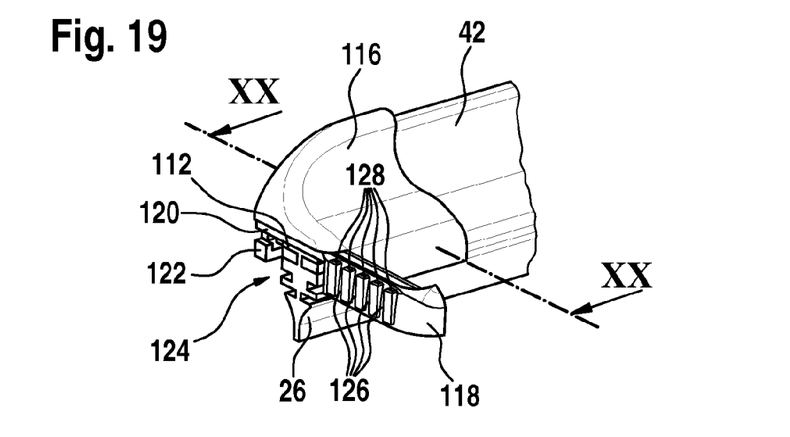
Figure 20:
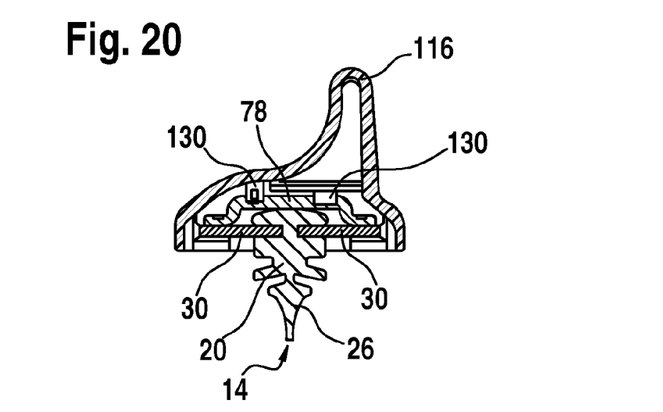
FIG. 20 shows a section corresponding to the line xx-xx in FIG. 19.

The embodiment according to FIG. 18 to FIG. 20 comprises an end cap 116 which, on its end wall which points towards the end of the wiper strip 14, has a slide 118 which can be displaced transversely with respect to the longitudinal direction 72 of the wiper strip 14 in a guide 120. A latching element 122 secures the slide 118 in the closed position while, in an open position, the slide 118 opens up an opening 124 through which the wiper strip 14 can be fitted and removed. For easier actuation of the slide 118, bumps 128 between which scores 126 are arranged are provided on its outside. Instead of the scores 126 and bumps 128, use can also be made of other grippy surface structures, for example the surface can be roughened. The wiper strip 14 is fixed with its spring rails 30 relative to the supporting element 12 by the wiper strip 14 being supported with its thickened portions 112 on the closed slide 118 and the end cap 116 being supported, on the other hand, via latching elements 130 on that end side of the bridge 78 which faces away from the slide 118.

The invention claimed is:

1. Wiper blade (10) with a supporting element (12) which has two interconnected spring rails (30), and with a wiper strip (14) including a top strip (20) and longitudinal grooves (34) into which the spring rails (30) are inserted in a manner allowing the wiper strip to be exchanged, characterized in that the spring rails (30) extend along a portion of the longitudinal grooves (34) and terminate prior to an end of the longitudinal grooves (34) to define an end surface of the spring rails (30), characterized in that one end of the wiper strip (14) is connected fixedly to a separable thickened portion (74, 98, 100, 108, 110, 112, 114) by means of which the wiper strip (14) can be fixed relative to the supporting element (12), characterized in that the thickened portion (74, 98, 100, 114) extends into the longitudinal grooves (34) and an end surface of the thickened portion in the grooves is disposed opposite the one end of the wiper strip (14), characterized in that a bridge (78) connects the spring rails (30), and characterized in that the bridge (78) abuts against the end surface of the thickened portion (74, 98, 100, 114) and the end surface of the spring rails (30) abuts against the end surface of the thickened portion (74, 98, 100, 114) in the grooves (34) to retain the spring rails (30) on the wiper strip (14).

2. Wiper blade (10) according to claim 1, characterized in that the thickened portion (74, 98, 100, 114) can abut against the bridge (78).

3. Wiper blade (10) according to claim 1, characterized in that the wiper strip (14) can be fixed by means of an end cap (38, 116).

4. Wiper blade (10) according to claim 3, characterized in that the end cap (38) engages over the thickened portion (74, 98, 100, 114) and the bridge (78) and has releasable latching means (82, 92; 130).

5. Wiper blade (10) according to claim 1, characterized in that the thickened portion is a clip (74, 98, 100) made of metal and/or plastic.

6. Wiper blade (10) according to claim 1, characterized in that the thickened portion includes a staple (100) which is fitted in the region of the top strip (20) and/or of a web (28).

7. Wiper blade (10) according to claim 1, characterized in that the thickened portion (114) is integrally formed as a single piece at the end of the wiper strip (14) and protrudes over the top strip (20) transversely with respect to the longitudinal direction (72) and/or at least partially fills a region of the longitudinal grooves (34).

8. Wiper blade (10) according to claim 3, characterized in that at least one end cap (38, 116) is provided which has an opening (96, 124) which can be opened and closed.

9. Wiper blade (10) according to claim 8, characterized in that the opening (96) can be closed by a flap (82) which is connected to the cap (38) in particular via a film hinge (84).

10. Wiper blade (10) according to claim 9, characterized in that the film hinge (84) is arranged in the longitudinal direction (72).

11. Wiper blade (10) according to claim 9, characterized in that the flap (82) or a slide (118) has a grippy surface structure which in particular has scores (126), bumps (128) or roughened portions.

12. Wiper blade (10) according to claim 2, characterized in that the wiper strip (14) can be fixed by means of an end cap (38, 116).

13. Wiper blade (10) according to claim 12, characterized in that the end cap (38) engages over the thickened portion (74, 98, 100, 114) and the bridge (78) and has releasable latching means (82, 92; 130).

14. Wiper blade (10) according to claim 13, characterized in that the thickened portion is a clip (74, 98, 100) made of metal and/or plastic.

15. Wiper blade (10) according to claim 14, characterized in that the thickened portion is a staple (100) which is fitted in the region of the top strip (20) and/or of a web (28).

16. Wiper blade (10) according to claim 4, characterized in that at least one end cap (38, 116) is provided which has an opening (96, 124) which can be opened and closed.

17. Wiper blade (10) according to claim 8, characterized in that the flap (82) or a slide (118) has a grippy surface structure which in particular has scores (126), bumps (128) or roughened portions.

18. Wiper blade according to claim 1, wherein the thickened portion (74, 98, 100, 114) and the bridge (78) extend above the top strip (20) and wherein the bridge (78) abuts against the thickened portion (74, 98, 100, 114), such that the thickened portion (74, 98, 100, 114) retains the bridge (78) on the wiper strip (14).

19. Wiper blade according to claim 1, wherein the thickened portion (74, 98, 100, 114) substantially fills a portion of the longitudinal grooves (34).

20. Wiper blade according to claim 1, wherein the end surface of the spring rails (30) directly abuts against the thickened portion (74, 98, 100, 114) prior to the end of the longitudinal grooves (34).

* * * * *

UNITED STATES PATENT AND TRADEMARK OFFICE
CERTIFICATE OF CORRECTION

PATENT NO.         : 8,745,813 B2
APPLICATION NO.    : 12/377912
DATED              : June 10, 2014
INVENTOR(S)        : Yoshiyuki Ishida et al.

It is certified that error appears in the above-identified patent and that said Letters Patent is hereby corrected as shown below:

On the title page, above "(51) Int. Cl.", add the following:

"(30)         Foreign Application Priority Data"
"Aug. 18, 2006   (DE) .................. 10 2006 038 712.0".

Signed and Sealed this
Eleventh Day of November, 2014

Michelle K. Lee
*Deputy Director of the United States Patent and Trademark Office*